Figure 3:
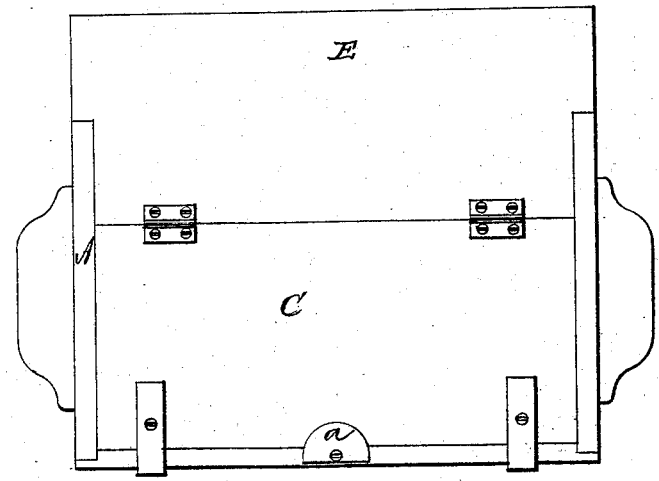

2 Sheets--Sheet 1.
E. GERRY.
Bee-Hives.
No. 137,433. Patented April 1, 1873.
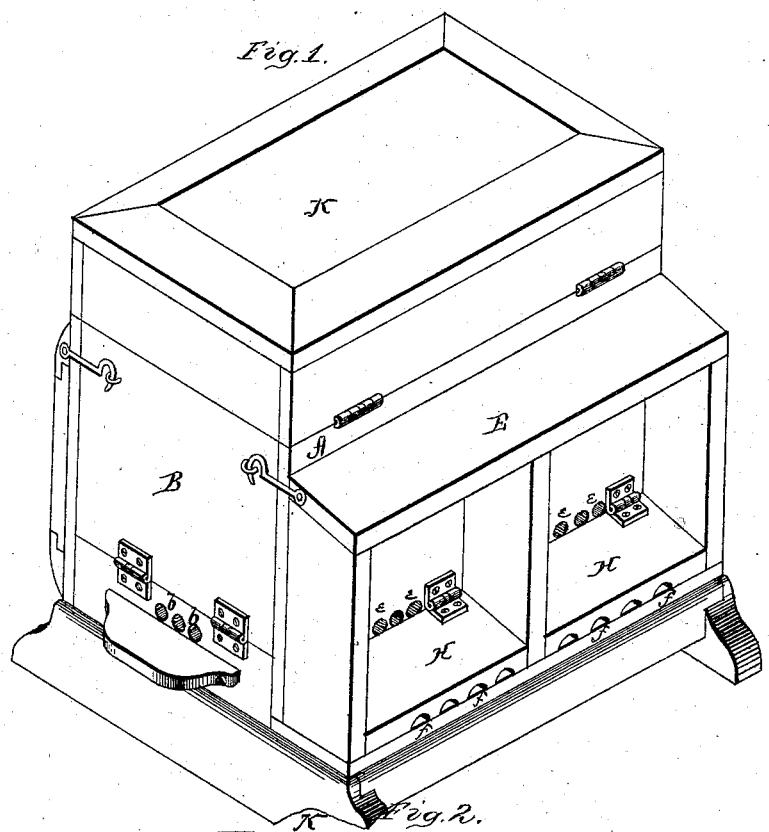
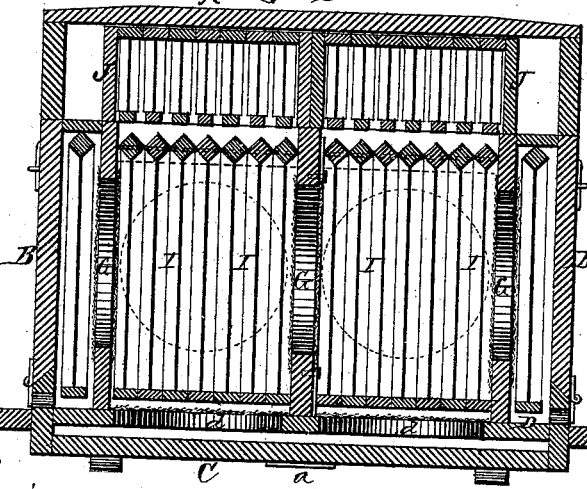

2 Sheets--Sheet 2.

E. GERRY.
Bee-Hives.

No. 137,433. Patented April 1, 1873.

Witnesses
John A. Ellis.
Wm K. Ellis.

Inventor
Edson Gerry
Per
C. H. Watson &Co
Atty's

UNITED STATES PATENT OFFICE.

EDSON GERRY, OF GARDEN CITY, MINNESOTA.

IMPROVEMENT IN BEE-HIVES.

Specification forming part of Letters Patent No. 137,433, dated April 1, 1873; application filed January 7, 1873.

*To all whom it may concern:*

Be it known that I, EDSON GERRY, of Garden City, in the county of Blue Earth and State of Minnesota, have invented certain new and useful Improvements in Bee-Hives; and I do hereby declare that the following is a full, clear, and exact description thereof, that will enable others skilled in the art to which it appertains to make and use the same, reference being had to the accompanying drawing and to the letters of reference marked thereon, which form a part of this specification.

The nature of my invention consists in the construction and arrangement of a bee-hive, as will be hereinafter more fully set forth.

In order to enable others skilled in the art to which my invention appertains to make and use the same, I will now proceed to describe its construction and operation, referring to the annexed drawing, in which—

Figure 1 is a perspective view of my hive. Fig. 2 is a longitudinal vertical section, and Fig. 3 a bottom view, of the same.

A represents the case or box of my hive, having a downward-opening door, B, at each end, and a hinged bottom, C. This bottom is held in position by a button, a, which may be turned so as to let the bottom down onto the rack on which the hive stands, and thus facilitate the cleaning of the hive. The end doors B B allow of the combs, or, rather, comb-frames, being taken out without breaking the combs. Below each door B are openings, b b, leading into the nursery-compartments inside. A suitable distance above the regular bottom C is a false bottom, D, with wire-cloth-covered openings, d d, the space between said two bottoms C and D forming a moth-chamber. On the front of the hive is formed a veranda, E, with alighting-boards H. Above said alighting-boards are the entrances e e, and beneath the same are openings f f, which are intended for the moth. As they are driven from the main entrances e e, they will seek the lower entrances and pass into the moth-chamber below the screen or false bottom D. The interior of the hive is, by three screen-partitions, G G, divided into two brood-chambers, with a series of comb-frames, I I, in each, and a nursery-compartment at each end, with a single frame in each. The tops of the nursery-compartments are closed, as shown, while above each brood-chamber is placed a honey-box, J, formed of a series of frames, as shown, and the whole hive is covered by a hinged cap, K.

It will thus be seen that this hive is intended for two swarms or colonies of bees, and the apartments for raising queens are so arranged—one at each end of the hive—that the animal heat of the colonies may be received in the same through the dividing-boards G G, each of which has a double screen, as shown. The heat, by means of these partitions, passes through all the apartments, so that a weak colony may be put in beside a strong one, and still have the same amount of heat as the large colony. The amount of heat retained aids and helps to keep the young brood warm.

This hive does not require so many bees to lie idle to keep up the heat for hatching brood, being assisted by the other swarm by its side; also, when extracting, the queen may be taken from the main part of the hive, and put into the apartment for raising queens, and continue by permitting the workers to occupy all the comb in the main part of the hive for depositing honey, and removes the liability of injuring the queen by handling the comb and frames. Many queens are killed by accidents when extracting if they are permitted to remain among the larger part of the workers. The queens can be wintered with perfect safety with but a few bees, by the assistance of the heat created by the bees in the other apartments. Then in the spring the queens are ready to create their colonies, and plenty of bees are raised in time to gather honey from the first flowers that appear in the spring.

Having thus fully described my invention, what I claim as new, and desire to secure by Letters Patent, is—

1. The hinged lighting-board H, having the bee-entrances *e e* above, and forming the shelter and guide to the entrances *f f* leading to the moth-trap below, all as and for the purpose specified.

2. The casing A, end doors B B, screen-partitions G G, combined with entrances *e e* and *b b*, having no passage between the separate divisions of the hive, as and for the purpose specified.

In testimony that I claim the foregoing I have hereunto set my hand this 19th day of December, 1872.

EDSON GERRY.

Witnesses:
HENRY E. GERRY,
FRANK WARREN.